US010518254B2

(12) United States Patent
Patchett et al.

(10) Patent No.: US 10,518,254 B2
(45) Date of Patent: Dec. 31, 2019

(54) CATALYZED SCR FILTER AND EMISSION TREATMENT SYSTEM

(71) Applicant: BASF CORPORATION, Florham Park, NJ (US)

(72) Inventors: Joseph A. Patchett, Basking Ridge, NJ (US); Joseph C. Dettling, Howell, NJ (US); Elizabeth A. Przybylski, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/262,561

(22) Filed: Jan. 30, 2019

(65) Prior Publication Data
US 2019/0232263 A1    Aug. 1, 2019

Related U.S. Application Data

(60) Division of application No. 15/672,932, filed on Aug. 9, 2017, now Pat. No. 10,258,972, which is a continuation of application No. 15/355,130, filed on Nov. 18, 2016, now Pat. No. 9,757,717, which is a continuation of application No. 15/054,753, filed on Feb. 26, 2016, now Pat. No. 9,517,456, which is a continuation of application No. 14/454,931, filed on Aug. 8, 2014, now Pat. No. 9,517,455, which is a continuation of application No. 13/274,635, filed on Oct. 17, 2011, now Pat. No. 8,899,023, which is a continuation of application No. 11/676,798, filed on Feb. 20, 2007, now Pat. No. 9,032,709, which is a division of application No. 10/634,659, filed on Aug. 5, 2003, now Pat. No. 7,229,597.

(51) Int. Cl.
| | | |
|---|---|---|
| *B01J 29/76* | (2006.01) | |
| *B01D 5/00* | (2006.01) | |
| *B01D 19/00* | (2006.01) | |
| *B01D 53/94* | (2006.01) | |
| *B01J 37/02* | (2006.01) | |
| *F01N 3/023* | (2006.01) | |
| *F01N 3/10* | (2006.01) | |
| *F01N 3/20* | (2006.01) | |
| *F01N 13/00* | (2010.01) | |
| *F01N 3/28* | (2006.01) | |
| *B01J 35/04* | (2006.01) | |
| *B01J 35/10* | (2006.01) | |
| *B01J 37/08* | (2006.01) | |

(52) U.S. Cl.
CPC .......... *B01J 29/7615* (2013.01); *B01D 5/009* (2013.01); *B01D 5/0054* (2013.01); *B01D 19/0005* (2013.01); *B01D 19/0036* (2013.01); *B01D 53/945* (2013.01); *B01D 53/9413* (2013.01); *B01D 53/9418* (2013.01); *B01D 53/9477* (2013.01); *B01J 29/76* (2013.01); *B01J 35/04* (2013.01); *B01J 35/1076* (2013.01); *B01J 37/024* (2013.01); *B01J 37/0236* (2013.01); *B01J 37/0246* (2013.01); *B01J 37/08* (2013.01); *F01N 3/0231* (2013.01); *F01N 3/10* (2013.01); *F01N 3/106* (2013.01); *F01N 3/2066* (2013.01); *F01N 3/2828* (2013.01); *F01N 3/2892* (2013.01); *F01N 13/009* (2014.06); *B01D 53/944* (2013.01); *B01D 2251/2062* (2013.01); *B01D 2251/2067* (2013.01); *B01D 2255/102* (2013.01); *B01D 2255/20715* (2013.01); *B01D 2255/20738* (2013.01); *B01D 2255/20761* (2013.01); *B01D 2255/50* (2013.01); *B01D 2255/502* (2013.01); *B01D 2255/9155* (2013.01); *B01D 2255/9202* (2013.01); *B01D 2255/9205* (2013.01); *B01D 2257/404* (2013.01); *B01D 2258/012* (2013.01); *F01N 2330/06* (2013.01); *F01N 2330/30* (2013.01); *F01N 2370/04* (2013.01); *F01N 2510/063* (2013.01); *F01N 2610/02* (2013.01); *F01N 2610/08* (2013.01); *Y02T 10/22* (2013.01); *Y02T 10/24* (2013.01); *Y10S 55/10* (2013.01); *Y10S 55/30* (2013.01); *Y10T 29/49345* (2015.01)

(58) Field of Classification Search
CPC ..... B01J 29/76; B01J 29/7615; F01N 13/009; B01D 5/0054; B01D 5/009
USPC ......................................................... 502/64
See application file for complete search history.

(56) References Cited

U.S. PATENT DOCUMENTS

| | | |
|---|---|---|
| 2,975,025 A | 3/1961 | Cohn et al. |
| 4,220,633 A | 9/1980 | Pirsh |
| 4,309,386 A | 1/1982 | Pirsh |
| 4,329,162 A | 5/1982 | Pitcher, Jr. |
| 4,404,007 A | 9/1983 | Tukao et al. |
| 4,455,180 A | 6/1984 | Hillman et al. |

(Continued)

FOREIGN PATENT DOCUMENTS

| | | |
|---|---|---|
| DE | 01323607 | 12/2004 |
| DE | 10-2004-040548 | 2/2006 |

(Continued)

OTHER PUBLICATIONS

U.S. Appl. No. 08/141,311, filed Oct. 22, 1993, Speronello.

(Continued)

*Primary Examiner* — Edward M Johnson
(74) *Attorney, Agent, or Firm* — Womble Bond Dickinson (US) LLP

(57) ABSTRACT

Provided is a catalyst article for simultaneously remediating the nitrogen oxides (NOx), particulate matter, and gaseous hydrocarbons present in diesel engine exhaust streams. The catalyst article has a soot filter coated with a material effective in the Selective Catalytic Reduction (SCR) of NOx by a reductant, e.g., ammonia.

8 Claims, 7 Drawing Sheets

(56) References Cited

U.S. PATENT DOCUMENTS

| | | |
|---|---|---|
| 4,510,265 A | 4/1985 | Hartwig |
| 4,519,820 A | 5/1985 | Oyobe et al. |
| 4,557,962 A | 12/1985 | Belmonte et al. |
| 4,576,774 A | 3/1986 | Hazard et al. |
| 4,752,516 A | 6/1988 | Montierth |
| 4,759,892 A | 7/1988 | Bonzo |
| 4,793,981 A | 12/1988 | Doyle et al. |
| 4,849,399 A | 7/1989 | Joy, III et al. |
| 4,857,089 A | 8/1989 | Kitagawa et al. |
| 4,902,487 A | 2/1990 | Cooper et al. |
| 4,912,077 A | 3/1990 | Lachman et al. |
| 4,912,776 A | 3/1990 | Alcorn |
| 4,934,142 A | 6/1990 | Hayashi et al. |
| 4,961,917 A | 10/1990 | Byrne |
| 4,963,332 A | 10/1990 | Brand et al. |
| 4,983,423 A | 1/1991 | Goldsmith |
| 5,024,981 A | 6/1991 | Speronello et al. |
| 5,041,270 A | 8/1991 | Fujitani et al. |
| 5,100,632 A | 3/1992 | Dettling et al. |
| 5,114,581 A | 5/1992 | Goldsmith et al. |
| 5,165,970 A | 11/1992 | Schmidt et al. |
| 5,221,484 A | 6/1993 | Goldsmith et al. |
| 5,279,997 A | 1/1994 | Montreuil et al. |
| 5,462,907 A | 10/1995 | Farrauto et al. |
| 5,491,120 A | 2/1996 | Voss et al. |
| 5,516,497 A | 5/1996 | Speronello et al. |
| 5,522,218 A | 6/1996 | Lane |
| 5,716,899 A | 2/1998 | Guile et al. |
| 5,746,989 A | 5/1998 | Murachi et al. |
| 5,804,155 A | 9/1998 | Farrauto |
| 5,928,981 A | 7/1999 | Leyrer et al. |
| 6,074,973 A | 6/2000 | Lampert et al. |
| 6,171,566 B1 | 1/2001 | Ku et al. |
| 6,248,684 B1 | 6/2001 | Yavuz et al. |
| 6,294,141 B1 | 9/2001 | Twigg et al. |
| 6,312,650 B1 | 11/2001 | Frederiksen et al. |
| 6,314,722 B1 | 11/2001 | Matros et al. |
| 6,375,910 B1 | 4/2002 | Deeba et al. |
| 6,415,602 B1 | 7/2002 | Patchett et al. |
| 6,419,890 B1 | 7/2002 | Li |
| 6,685,900 B2 | 2/2004 | Domesle et al. |
| 6,696,031 B1 | 2/2004 | Twigg et al. |
| 6,745,560 B2 | 6/2004 | Stroia et al. |
| 6,753,294 B1 | 6/2004 | Brisley et al. |
| 6,805,849 B1 | 10/2004 | Andreasson et al. |
| 6,813,884 B2 | 11/2004 | Shigapov et al. |
| 6,826,906 B2 | 12/2004 | Kakwani et al. |
| 6,843,971 B2 | 1/2005 | Schafer-Sindlinger et al. |
| 6,928,806 B2 | 8/2005 | Tennison et al. |
| 6,946,013 B2 | 9/2005 | Alward et al. |
| 6,946,107 B2 | 9/2005 | Carlborg et al. |
| 7,062,904 B1 | 6/2006 | Hu et al. |
| 7,078,004 B2 | 7/2006 | Voss et al. |
| 7,097,817 B2 | 8/2006 | Brisley et al. |
| 7,141,087 B2 | 11/2006 | Noguchi et al. |
| 7,229,597 B2 | 6/2007 | Patchett et al. |
| 7,264,785 B2 | 9/2007 | Blakeman |
| 7,265,580 B2 | 9/2007 | Sugawara et al. |
| 7,306,771 B2 | 12/2007 | Okawara |
| 7,625,529 B2 | 12/2009 | Ohno et al. |
| 7,727,498 B2 | 6/2010 | Hodgson et al. |
| 7,902,107 B2 | 3/2011 | Patchett |
| 8,122,603 B2 | 2/2012 | Patchett |
| 8,899,023 B2 | 12/2014 | Patchett |
| 9,032,709 B2 | 5/2015 | Patchett |
| 9,039,982 B2 | 5/2015 | Patchett |
| 9,039,983 B1 | 5/2015 | Patchett |
| 9,039,984 B1 | 5/2015 | Patchett |
| 9,040,006 B1 | 5/2015 | Patchett |
| 9,121,327 B2 | 9/2015 | Patchett |
| 9,144,795 B2 | 9/2015 | Patchett |
| 2002/0004897 A1 | 1/2002 | Kao |
| 2002/0039550 A1 | 4/2002 | Schafer-Sindlinger et al. |
| 2002/0104312 A1 | 8/2002 | Hoffman et al. |
| 2003/0040425 A1 | 2/2003 | Huang et al. |
| 2003/0044520 A1 | 3/2003 | Klessling et al. |
| 2003/0101714 A1 | 6/2003 | Huthwohl et al. |
| 2003/0101718 A1 | 6/2003 | Pfeifer et al. |
| 2003/0115859 A1 | 6/2003 | Deeba |
| 2004/0215147 A1 | 10/2004 | Wessman et al. |
| 2005/0042151 A1 | 2/2005 | Alward et al. |
| 2005/0056004 A1 | 3/2005 | Kakwani et al. |
| 2005/0069476 A1 | 3/2005 | Blakeman et al. |
| 2005/0215977 A1 | 9/2005 | Uschold |
| 2007/0140928 A1 | 6/2007 | Beall et al. |
| 2008/0125316 A1 | 5/2008 | Noda et al. |
| 2008/0250775 A1 | 10/2008 | Bruck |
| 2009/0129995 A1 | 5/2009 | Pfeifer et al. |

FOREIGN PATENT DOCUMENTS

| | | |
|---|---|---|
| EP | 0756891 | 2/1997 |
| EP | 0766993 | 4/1997 |
| EP | 1203611 | 8/2002 |
| EP | 1298112 | 4/2003 |
| EP | 1300193 | 4/2003 |
| EP | 1338322 | 8/2003 |
| EP | 1920839 | 5/2008 |
| JP | 57-035918 | 2/1982 |
| JP | H01151706 | 6/1989 |
| JP | 02-230538 | 9/1990 |
| JP | 1989-0313052 | 6/1991 |
| JP | H0440184 | 2/1992 |
| JP | 09-173866 | 7/1997 |
| JP | 09-220423 | 8/1997 |
| JP | 11-021275 | 1/1999 |
| JP | 2000-213335 | 8/2000 |
| JP | 2001-029793 | 2/2001 |
| JP | 2001-041028 | 2/2001 |
| JP | 2001-329829 | 11/2001 |
| JP | 2002-159859 | 6/2002 |
| JP | 2002-188435 | 7/2002 |
| JP | 2002-301323 | 10/2002 |
| JP | 2002-336656 | 11/2002 |
| JP | 2002-361047 | 12/2002 |
| JP | 2002-540916 | 12/2002 |
| JP | A-2002-361047 | 12/2002 |
| JP | 2003-097251 | 4/2003 |
| JP | 2003-97251 | 4/2003 |
| JP | 2003-154223 | 5/2003 |
| JP | 2004-060494 | 2/2004 |
| JP | 2005-262144 | 9/2005 |
| JP | 2007-021409 | 2/2007 |
| KR | 2002-0026516 | 4/2002 |
| KR | 2003-0041133 | 5/2003 |
| WO | WO 99/39809 | 8/1999 |
| WO | WO-01/12320 | 2/2001 |
| WO | WO-2001/012320 | 2/2001 |
| WO | WO-01/96717 | 12/2001 |
| WO | WO-02/14657 | 2/2002 |
| WO | WO-02/26351 | 4/2002 |
| WO | WO-03/051488 | 6/2003 |
| WO | WO-03/054364 | 7/2003 |
| WO | WO-2007/026844 | 3/2007 |

OTHER PUBLICATIONS 1.132 Declaration by Andrew P. Walker, Ph.D. in U.S. Appl. No. 95/001,745, Feb. 29, 2012, 52 pages.
1.132 Declaration by Andrew P. Walker, Ph.D. in U.S. Appl. No. 95/001,744, Feb. 29, 2012, 52 pgs.
1.132 Declaration by Paul R. Phillips, Ph.D. in U.S. Appl. No. 95/001,744, Feb. 3, 2012, 25 pages.
1.132 Declaration by Paul R. Phillips, Ph.D. in U.S. Appl. No. 95/001,745, Feb. 3, 2012, 26 pages.
1.132 Declaration of Philip G. Blakeman, Ph.D., U.S. Appl. No. 95/001,744, Jan. 3, 2012, 49 pages.
1.132 Declaration of Philip G. Blakeman, Ph.D., U.S. Appl. No. 95/001,745, Jan. 3, 2012, 51 pages.
Action Closing Prosecution in U.S. Appl. No. 95/001,744 and U.S. Appl. No. 95/001,894, dated May 14, 2014, 66 pages.
Action Closing Prosecution in U.S. Appl. No. 95/001,744, dated May 3, 2012, 71 pages.

(56) References Cited

OTHER PUBLICATIONS

Action Closing Prosecution in U.S. Appl. No. 95/001,745, dated Aug. 16, 2012, 79 pages.
Appeal Decision in Japanese Patent Application No. 2006-522653, Appeal No. 2011-19661 Jun. 26, 2012, 17 pages.
Final Written Decision for U.S. Pat. No. 8,899,023, Case No. IPR2015-01265, Nov. 30, 2016, 37 pages.
Final Written Decision for U.S. Pat. No. 9,032,709, Case No. IPR2015-01267, Nov. 30, 2016, 37 pages.
Final Written Decision for U.S. Pat. No. 9,039,982, Case No. IPR2015-01266, Nov. 30, 2016, 37 pages.
Cars and Light Trucks, DieselNet Emissions Standards—EU, 6 pages.
Catalyzed Diesel Filters, DieselNet Technology Guide—www.DieselNet.com Mar. 2002, 1-14.
Declaration by Raj R. Rajaram, Ph.D. under 37 C.F.R. § 1.132 in Control No. 95/001,744, Aug. 2, 2012, 6 pages.
English Translation of Excerpt from JP-2003-154223, 2 pages.
English Translation of JP-09-220423, 13 pages.
English Translation of JP-2002-361047, 51 pages.
English Translation of Umicore AG & Co. KG Opposition against EP B 1663458, 22 pages.
Final Office Action in U.S. Appl. No. 11/676,798, dated Jul. 3, 2013, 12 pages.
Final Office Action in U.S. Appl. No. 12/028,300, dated Jan. 6, 2009, 7 pages.
Final Office Action in U.S. Appl. No. 11/676,798, dated Jan. 4, 2010, 13 pages.
Final Office Action in U.S. Appl. No. 11/676,798, dated May 25, 2012, 20 pages.
Final Office Action in U.S. Appl. No. 12/028,300, dated Jan. 11, 2010, 11 pages.
Final Office Action in U.S. Appl. No. 12/028,300, dated Jun. 23, 2010, 12 pages.
Final Office Action in U.S. Appl. No. 13/274,635, dated Apr. 16, 2014, 9 pages.
Johnson Matthey Opposition to EP 1663458 B1, Oct. 20, 2009, 12 pages.
Minutes and Decision of Opposition in EP Patent Appln. No. 04 779 815.5, May 2, 2012, 31 pages.
Non-Final Office Action in U.S. Appl. No. 10/634,659, dated Aug. 22, 2006, 9 pages.
Non-Final Office Action in U.S. Appl. No. 11/676,798, dated Feb. 14, 2008, 8 pages.
Non-Final Office Action in U.S. Appl. No. 12/028,300, dated Jul. 2, 2008, 8 pages.
Non-Final Office Action in U.S. Appl. No. 11/676,798, dated Jun. 2, 2009, 12 pages.
Non-Final Office Action in U.S. Appl. No. 11/676,798, dated Sep. 7, 2010, 14 pages.
Non-Final Office Action in U.S. Appl. No. 11/676,798, dated Aug. 21, 2008, 7 pages.
Non-Final Office Action in U.S. Appl. No. 12/028,300, dated Aug. 27, 2009, 8 pages.
Non-Final Office Action in U.S. Appl. No. 12/420,895, dated Jul. 12, 2011, 27 pages.
Non-Final Office Action in U.S. Appl. No. 11/676,798, dated Jun. 4, 2014, 12 pages.
Non-Final Office Action in U.S. Appl. No. 11/676,798, dated Dec. 6, 2012, 14 pages.
Non-Final Office Action in U.S. Appl. No. 11/676,798, dated Aug. 2, 2011, 13 pages.
Non-Final Office Action in U.S. Appl. No. 12/028,300, dated Apr. 13, 2010, 18 pages.
Non-Final Office Action in U.S. Appl. No. 13/274,635, dated Apr. 15, 2013, 9 pages.
Non-Final Office Action in U.S. Appl. No. 95/001,744, dated Dec. 1, 2011, 21 pages.
Non-Final Office Action in U.S. Appl. No. 95/001,745, dated Nov. 30, 2011, 33 pages.
Non-Final Office Action in U.S. Appl. No. 95/001,894, dated May 9, 2012, 26 pages.
Order Granting Reexamination in U.S. Appl. No. 95/001,894, dated May 9, 2012, 12 pages.
PCT International Search Report in PCT/US2004/024864, dated Oct. 25, 2004, 4 pages.
Reexamination Order in U.S. Appl. No. 95/001,744, Dec. 1, 2011, 20 pages.
Reexamination Order in U.S. Appl. No. 95/001,745, Nov. 30, 2011, 26 pages.
Request for Inter Partes Reexamination in U.S. Pat. No. 7,902,107, Feb. 15, 2012, 26 pages.
Request for Reexamination of U.S. Pat. No. 7,902,107, Sep. 7, 2011, 109 pages.
Request for Reexamination of U.S. Pat. No. 7,229,597, Sep. 7, 2011, 115 pages.
Right of Appeal Notice in U.S. Appl. No. 95/001,745, dated Aug. 13, 2013, 92 pages.
Second Declaration by Philip G. Blakeman, Ph.D. under 37 C.F.R § 1.132 in U.S. Appl. No. 95/001,744, Aug. 2, 2012, 6 pages.
Second Declaration by Paul R. Phillips, Ph.D. under 37 C.F.R § 1.132 in U.S. Appl. No. 95/001,744, Aug. 2, 2012, 4 pages.
Third Party Comments After Patent Owner's Response under 37 C.F.R. § 1.947, U.S. Appl. No. 95/001,744, Aug. 2, 2012, 28 pages.
Third Party Comments After Patent Owner's Response Under 37 C.F.R. § 1.947, U.S. Appl. No. 95/001,745, 108 pages.
Third Party Comments After Patent Owner's Response Under 37 C.F.R. § 1.947, U.S. Appl. No. 95/001,744, 99 pages.
Third Party Comments After Patent Owner's Response in Inter Partes Reexamination under 37 C.F.R. § 1.947, U.S. Appl. No. 95/001,894, Aug. 10, 2012, 30 pages.
U.S. Appl. No. 11/271,004, filed Nov. 10, 2005.
U.S. Appl. No. 11/676,798, filed Feb. 20, 2007.
U.S. Appl. No. 12/022,338, filed Jan. 30, 2008.
U.S. Appl. No. 12/420,895, filed Apr. 9, 2009.
U.S. Appl. No. 12/028,300, filed Feb. 8, 2008.
U.S. Appl. No. 14/497,454, filed Sep. 26, 2014.
Umicore AG & Co. KG Opposition to EPB1663458, Oct. 14, 2009, 22 pages.
Wall-Flow Monoliths, DieselNet Technology Guide—www.DieselNet.com Mar. 2003, 1-21.
Choi, J-H, et al., Preparation of SCR catalytic filter supported on a filter candle, Dept. of Chem. Eng., Gyeongsang National university Mar. 15, 2001, 1 page.
Choi, Joo-Hong, et al., The Reactivity of V2—W03—TiO2 Catalyst Supported on a Ceramic Filter Candle for Selective Reduction of NO, Korean J. Chem. Eng. vol. 18(5) Jul. 21, 2001, 719-724.
Durilla, M., et al., Composite SCR Catalysts for NOx Reduction, Ann. Meeting of the Industrial Gas Cleaning Inst. Mar. 1990, 22 pages.
Gieshoff, J., et al., Improved SCR Systems for Heavy Duty Applications, SAE World Congress Mar. 2000, 10 pages.
Hashimoto, S., et al., SiC and Cordierite Diesel Particulate Filters Designed for Low Pressure Drop and Catalyzed, Uncatalyzed Systems, SAE Technical Paper Series 2002-01-0322 2002, 16 pages.
Heck, R. M., et al., Catalytic Air Pollution Control, John Wiley & Sons, Inc. 1995, 161-178.
Heck, Ronald M., et al., Catalytic Air Pollution Control, John Wiley & Sons, Inc., 2002, 5 pages.
Heck, Ronald M., et al., Catalytic Air Pollution Control, John Wiley & Sons, Inc. 2002, 9 pages.
Heck, R. M., et al., Catalytic Air Pollution Control—Commercial Technology, John Wiley & Sons, Inc., Second Ed., Chapters 8 & 9 Date, 79 pages.
Ichikawa, S., et al., Material Development of High Porous SiC for Catalyzed Diesel Particulate Filters, SAE World Congress Mar. 2003, 8 pages.
Meng, B., Construction materials for supporting components, Bauverlag, $3^{rd}$ Edition 1996, 67-74.
Nakatan I, K., et al., Simultaneous PM and NOx Reduction System for Diesel Engines, SAE World Congress 2002, 10 pages.

(56) References Cited

OTHER PUBLICATIONS

Plummer, Jr., H.K., et al., Measurement of Automotive Catalyst Washcoat Loading Parameters by Microscopy Techniques, Microscopy and Microanalysis, vol. 5 1999, 267-281.
Saracco, Guido, et al., Catalytically Modified Fly-Ash Filters for NOx Reduction with $NH_3$, Chemical Engineering Science, vol. 51 No. 24 1996, 5289-5297.
Schaub, G., et al., Kinetic Analysis of Selective Catalytic NOx Reduction (SCR) in a Catalytic Filter, Chemical Engineering and Processing, vol. 42 2003, 365-371.
Non-certified English Translation of Petition for Invalidation of Korean Patent No. 1121397, dated Jan. 23, 2015, 37 pages.
Non-Final Office Action in U.S. Appl. No. 14/497,454, dated Dec. 16, 2014, 4 pages.
Non-Final Office Action in U.S. Appl. No. 14/497,454, dated Mar. 12, 2015, 8 pages.
Non-Final Office Action in U.S. Appl. No. 14/595,804, dated Feb. 12, 2015, 8 pages.
Teraoka, Yasutake, et al., Simultaneous Catalytic Removal of Nitrogen Oxides and Soot by Copper-Loaded MFI Zeolites, Chemistry Letters 2001, 604-605.
Certified Translation of Confirmation from the Technical Information Library at the University Library of Hannover dated Jun. 12, 2014, dated Mar. 18, 2015, 2 pages.
Certified Translation of Huthwohl, Georg, et al., The SCRT system—a combination particle filter with SCR catalyst—enables both particle and NOx emission to be reduced simultaneously in commercial vehicle diesel engines, Proceedings of the Dresden Motor Conference, May 1999 dated Nov. 13, 2012, 28 pages.
Declaration of Bernd Maurer, Ph.D., dated May 19, 2015, 4 pages.
Declaration of David L. Tennent, Ph.D., dated May 25, 2015, 25 pages.
Declaration of Michael P. Harold, Ph.D., dated May 21, 2015, 61 pages.
Declaration of Joseph C. Dettling at ¶ 13, Reexamination No. 95/001,744 (Jul. 3, 2012) dated Jun. 29, 2012, 16 pages.
*Johnson Matthey, Inc.* v. *BASF Corporation,* Petition for Inter Partes Review of U.S. Pat. No. 8,899,023, dated May 26, 2015, 66 pages.
*Johnson Matthey, Inc.* v. *BASF Corporation,* Petition for Inter Partes Review of U.S. Pat. No. 9,039,982, dated May 26, 2015, 60 pages.
*Johnson Matthey, Inc.* v. *BASF Corporation,* Petition for Inter Partes Review of U.S. Pat. No. 9,032,709, dated May 26, 2015, 64 pages.
Nitrogen Dioxides: Health, U.S. Environmental Protection Agency, available at http://www.epa.gov/oaops001/nitrooenoxides/health.html last updated Aug. 15, 2014 1 page.
Heck, Ronald M., et al., Catalytic Air Pollution Control Commercial Technology—Chapters 8 & 9 (Second Edition), John Wiley & Sons, Inc. 2002, 79 pages.
Abstract of Hashimoto indexed in STN, 3 pages.
Declaration of Magdi Khair, Case No. IPR2016-00610, filed in U.S. Pat. No. 8,899,023, dated Feb. 16, 2016.
Declaration of Magdi Khair, Case No. IPR2016-00612, filed in U.S. Pat. No. 9,032,709, dated Feb. 16, 2016.
Declaration of Magdi Khair, Case No. IPR2016-00613, filed in U.S. Pat. No. 9,039,982, dated Feb. 16, 2016.
Faiz et al., *Vehicle Technology fir Controlling* Emissions, "Air Pollution from Motor Vehicles—Standards and Technologies for Controlling Emissions", 1996, pp. 63-80.
Invalidation Action Brief, filed with the Korean Patent Office on Dec. 30, 2015 against Korean Patent No. KR 10-1121397.
Koebel et al., Recent Advances in the Development of Urea-SCR for Automotive Applications, "SAE Technical Paper Series No. 2001-01-3625", International Fall Fuels and Lubricants Meeting and Exposition, San Antonio, Texas, Sep. 24-27, 2001, pp. 1-10.
Petition for Inter Partes Review of U.S. Pat. No. 9,039,709 Pursuant to 35 U.S.C. § 312 and 37 C.F.R. § 42.104, Case No. IPR2016-00612, filed with the United States Patent and Trademark Office Before the Patent Trial and Appeal Board on Feb. 17, 2016.
Petition for Inter Partes Review of U.S. Pat. No. 8,899,023 Pursuant to 35 U.S.C. § 312 and 37 C.F.R. § 42.104, Case No. IPR2016-00610, filed with the United States Patent and Trademark Office Before the Patent Trial and Appeal Board on Feb. 17, 2016.
Petition for Inter Partes Review of U.S. Pat. No. 9,039,982 Pursuant to 35 U.S.C. § 312 and 37 C.F.R. § 42.104, Case No. IPR2016-00613, filed with the United States Patent and Trademark Office Before the Patent Trial and Appeal Board on Feb. 17, 2016.
The Patent Trial and Appeal Board, "Decision on Appeal", *Johnson Matthey, Inc. et al* v. *Patent of BASF Corporation.* Appeal 2017-006009—Reexamination Control 95/001,744 & 95/001,894 (merged), U.S. Pat. No. 7,902,017 B2—Technology Center 3900, Aug. 29, 2017.
The Patent Trial and Appeal Board, "Decision on Appeal", *Johnson Matthey, Inc.* v. *Patent of BASF Corporation.* Appeal 2017-009233—Reexamination Control 95/001,745, U.S. Pat. No. 7,229,597 B2—Technology Center 3900, Mar. 1, 2018.
The Patent Trial and Appeal Board, "Decision on Rehearing", *Johnson Matthey, Inc. et al* v. *Patent of BASF Corporation.* Appeal 2017-006009—Reexamination Control 95/001,744 & 95/001,894 (merged), U.S. Pat. No. 7,902,017 B2—Technology Center 3900, Mar. 1, 2018.

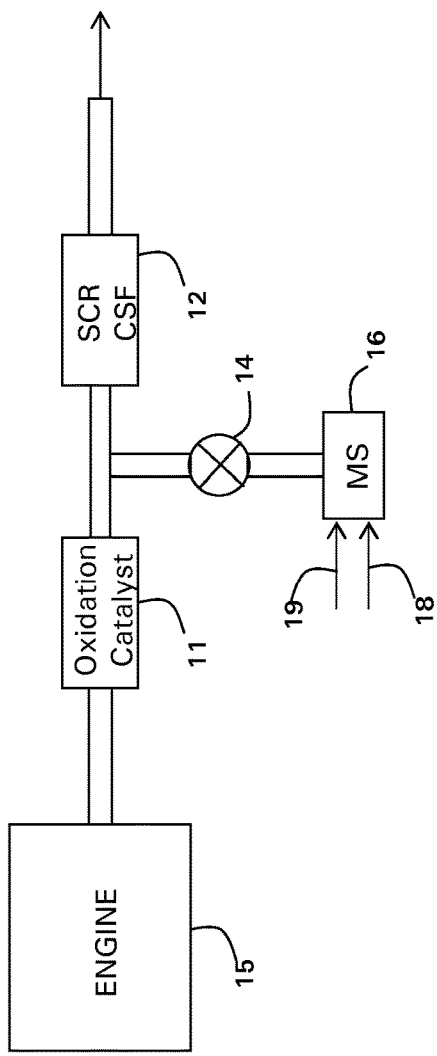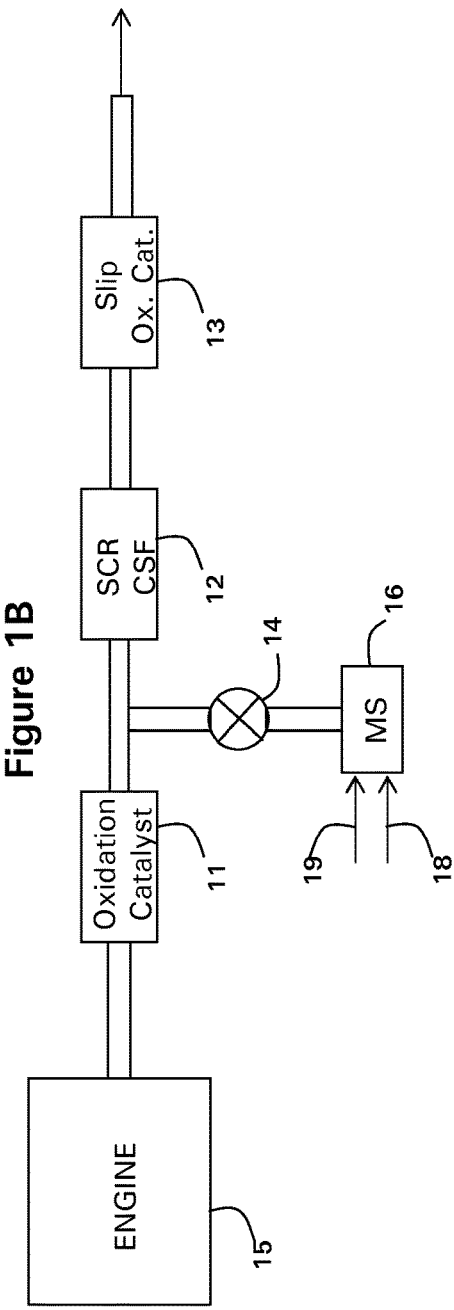

CATALYZED SCR FILTER AND EMISSION TREATMENT SYSTEM

CROSS-REFERENCE TO RELATED APPLICATIONS

This application is a division of U.S. application Ser. No. 15/672,932, filed Aug. 9, 2017, which is a continuation of U.S. application Ser. No. 15/355,130, filed Nov. 18, 2016, which is a continuation of U.S. application Ser. No. 15/054,753, filed Feb. 26, 2016, now U.S. Pat. No. 9,517,456, issued Dec. 13, 2016, which is a continuation of U.S. application Ser. No. 14/454,931, filed Aug. 8, 2014, now U.S. Pat. No. 9,517,455, issued Dec. 13, 2016, which is a continuation of U.S. application Ser. No. 13/274,635, filed Oct. 17, 2011, now U.S. Pat. No. 8,899,023, issued Dec. 2, 2014, which is a continuation of U.S. application Ser. No. 11/676,798, filed Feb. 20, 2007, now U.S. Pat. No. 9,032,709, issued May 19, 2015, which is a divisional application of U.S. application Ser. No. 0/634,659, filed Aug. 5, 2003, now U.S. Pat. No. 7,229,597, issued Jun. 12, 2007, the contents of each of which are hereby incorporated by reference in their entireties.

BACKGROUND

The present invention relates to an emission treatment system having an oxidation catalyst upstream of a soot filter coated with a material effective in the Selective Catalytic Reduction (SCR) of NOx by a reductant, e.g., ammonia. In one embodiment, the system provides an effective method of simultaneously remediating the nitrogen oxides (NOx), particulate matter, and gaseous hydrocarbons present in diesel engine exhaust streams.

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of NOx.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) also promote the oxidation of nitric oxide (NO) to $NO_2$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Provisions are generally introduced to lower the soot burning temperature in order to provide for passive regeneration of the filter. The presence of a catalyst promotes soot combustion, thereby regenerating the filters at temperatures accessible within the diesel engine's exhaust under realistic duty cycles. In this way a catalyzed soot filter (CSF) or catalyzed diesel particulate filter (CDPF) is effective in providing for >80% particulate matter reduction along with passive burning of the accumulating soot, and thereby promoting filter regeneration.

Future emissions standards adopted throughout the world will also address NOx reductions from diesel exhaust. A proven NOx abatement technology applied to stationary sources with lean exhaust conditions is Selective Catalytic Reduction (SCR). In this process, NOx is reduced with ammonia ($NH_3$) to nitrogen ($N_2$) over a catalyst typically composed of base metals. The technology is capable of NOx reduction greater than 90%, and thus it represents one of the best approaches for achieving aggressive NOx reduction goals. SCR is under development for mobile applications, with urea (typically present in an aqueous solution) as the source of ammonia. SCR provides efficient conversions of NOx as long as the exhaust temperature is within the active temperature range of the catalyst.

While separate substrates each containing catalysts to address discrete components of the exhaust can be provided in an exhaust system, use of fewer substrates is desirable to reduce the overall size of the system, to ease the assembly of the system, and to reduce the overall cost of the system. One approach to achieve this goal is to coat the soot filter with a catalyst composition effective for the conversion of NOx to innocuous components. With this approach, the catalyzed soot filter assumes two catalyst functions: removal of the particulate component of the exhaust stream and conversion of the NOx component of the exhaust stream to $N_2$.

Coated soot filters that can achieve NOx reduction goals require a sufficient loading of SCR catalyst composition on the soot filter. The gradual loss of the catalytic effectiveness of the compositions that occurs over time through exposure to certain deleterious components of the exhaust stream augments the need for higher catalyst loadings of the SCR catalyst composition. However, preparation of coated wall flow soot filters with higher catalyst loadings can lead to unacceptably high back pressure within the exhaust system. Coating techniques that allow higher catalyst loadings on the wall flow filter, yet still allow the filter to maintain flow characteristics that achieve acceptable back pressures are therefore desirable.

An additional aspect for consideration in coating the wall flow filter is the selection of the appropriate SCR catalyst composition. First, the catalyst composition must be durable so that it maintains its SCR catalytic activity even after prolonged exposure to higher temperatures that are characteristic of filter regeneration. For example, combustion of the soot fraction of the particulate matter often leads to temperatures above 700° C. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the NOx component of the exhaust to achieve NOx reduction goals, even at lower exhaust temperatures.

The prior art contains descriptions of the use of SCR catalyst compositions, soot filters and combinations thereof for the abatement of both the NOx and particulate components of diesel exhaust. These references are described below.

Japanese Kokai 3-130522, for example, discloses the treatment of diesel exhaust gases characterized by use of an ammonia injector and porous ceramic filter having a denitration catalyst within the pores. The filter is installed in the wake of the diesel engine exhaust. The ceramic porous filter comprises an upstream fine pore path layer, and a downstream side course ceramic particle layer on which the denitration catalyst was supported. The fine layer can support a platinum or palladium or other hydrocarbon combustion catalyst. The diesel exhaust gas containing unburned carbon flows through the porous ceramic filter and the carbon particles are filtered onto the surface. The gas containing nitric oxides and the ammonia passes through the denitration catalyst containing side of the filter and the nitric oxides are reduced to nitrogen and water. The oxidation catalyst on the upstream side causes the particulate component to burn off catalytically.

U.S. Pat. No. 4,912,776 discloses an oxidation catalyst, an SCR catalyst downstream and adjacent to the SCR catalyst, and a reductant source introduced to the exhaust stream between the oxidation catalyst and the SCR catalyst. Providing a higher feed containing a high proportion of $NO_2$ to NO to the SCR reactor is said to allow the use of lower temperatures and higher space velocities than is possible with a feed of NO.

WO 99/39809 discloses a system for treating combustion exhaust gas containing NOx and particulates that has an oxidation catalyst effective to convert at least a portion of the NO in the NOx to $NO_2$, a particulate trap, a source of reductant fluid and an SCR catalyst. The particulate trap is downstream of the oxidation catalyst; the reductant fluid source is downstream of the particulate trap; and the SCR catalyst is downstream of the reductant fluid source. Reductant fluids disclosed include ammonia, urea, ammonium carbamate and hydrocarbons (e.g., diesel fuel).

A catalytic wall flow filter for an exhaust system of a combustion engine is described in WO 01/12320. The wall flow filter has channels that are in honeycomb arrangement, where some of the channels are blocked at the upstream end and some of the channels that are unblocked at the upstream end are blocked at the downstream end. An oxidation catalyst is disposed on a gas impermeable zone at an upstream end of channels that are blocked at the downstream end. The filter has a gas permeable filter zone that is downstream of the oxidation catalyst that is for trapping soot. The oxidation catalyst is described to be capable (when in an exhaust system) of generating $NO_2$ from NO to combust the trapped soot continuously at temperatures below 400° C. The oxidation catalyst preferably includes a platinum group metal. Exhaust streams containing NO are initially passed over the oxidation catalyst to convert NO to $NO_2$ prior to filtering to remove soot. The exhaust gas then containing $NO_2$ is used to combust the soot trapped on the filter.

In some embodiments of the wall flow filter described in WO 01/12320 the downstream channels of the soot filter contain a catalyst for a NOx absorber and an SCR catalyst downstream of the NOx absorber. The SCR catalyst can be a copper-based material, platinum, a mixed oxide of vanadium and titania or a zeolite, or mixtures of two or more thereof.

SUMMARY OF THE INVENTION

In one aspect, the invention relates to an emission treatment system for treatment of an exhaust stream that contains NOx and particulate matter. The emission treatment system includes an oxidation catalyst, an injector that periodically meters ammonia or an ammonia precursor into the exhaust stream; and a wall flow monolith. The injector is in fluid communication with the oxidation catalyst, and is positioned downstream of the oxidation catalyst. The wall flow monolith contains an SCR catalyst composition, is in fluid communication with the injector, and is positioned downstream of the injector.

The wall flow monolith has a plurality of longitudinally extending passages formed by longitudinally extending walls bounding and defining said passages. The passages include inlet passages that have an open inlet end and a closed outlet end, and outlet passages that have a closed inlet end and an open outlet end. The wall flow monolith contains an SCR catalyst composition that permeates the walls at a concentration of at least 1.3 g/in³ (and preferably from 1.6 to 2.4 g/in³). The wall flow monolith has a wall porosity of at least 50% with an average pore size of at least 5 microns. Preferably, the SCR catalyst composition permeates the walls of the wall flow monolith so that the walls have a wall porosity of from 50 to 75% with an average pore size of from 5 to 30 microns.

In a preferred embodiment of the emission treatment system, the SCR catalyst composition contains a zeolite and base metal component selected from one or more of a copper and iron component. Preferably, the base metal component is a copper component. Preferred zeolites of the SCR catalyst composition have a silica to alumina ratio of at least about 10. For instance, a beta zeolite can be used in the SCR catalyst composition.

Among other things, the oxidation catalyst of the system is useful for combusting substantial portions of the particulate matter, and in particular, the VOF, entrained in the exhaust. In addition, a substantial portion of the NO in the NOx component is oxidized to $NO_2$ over the oxidation catalyst. In preferred embodiments, the oxidation catalyst is disposed on a honeycomb flow through monolith substrate or an open cell foam substrate. Preferably, the oxidation catalyst includes a platinum group metal component, and in particular, a platinum component. In some embodiments, the oxidation catalyst can also contain a zeolite component.

In another preferred embodiment of the emission treatment system, the system also has a diesel engine which is located upstream of, and in fluid communication with the oxidation catalyst.

Another aspect of the invention relates to a method for treating emissions produced in an exhaust stream that contains NOx and particulate matter. The method includes:

(a) passing the exhaust stream through an oxidation catalyst wherein a substantial portion of NO is oxidized to $NO_2$ to provide an $NO_2$-enriched exhaust stream;

(b) metering at periodic intervals, ammonia or an ammonia precursor into the NO2-enriched exhaust stream; and, (c) subsequently passing the exhaust stream through a wall flow monolith wherein particulate matter is filtered and a substantial portion of NOx is reduced to $N_2$.

Here again, the wall flow monolith has a plurality of longitudinally extending passages formed by longitudinally extending walls bounding and defining said passages. The passages include inlet passages that have an open inlet end and a closed outlet end, and outlet passages that have a closed inlet end and an open outlet end. The wall flow monolith contains an SCR catalyst composition that permeates the walls at a concentration of at least 1.3 $g/in^3$ (and preferably from 1.6 to 2.4 $g/in^3$). The wall flow monolith has a wall porosity of at least 50% with an average pore size of at least 5 microns. Preferably, the SCR catalyst composition permeates the walls of the wall flow monolith so that the walls have a wall porosity of from 50 to 75% with an average pore size of from 5 to 30 microns.

In another aspect, the invention relates to a method for disposing an SCR catalyst composition on a wall flow monolith. The method includes:

(a) immersing the wall flow monolith in an aqueous slurry comprising the SCR catalyst composition from a first direction to deposit the SCR catalyst composition on the inlet passages;

(b) removing excess slurry from the inlet passages by forcing a compressed gas stream through the outlet passages and applying a vacuum to the inlet passages;

(c) immersing the wall flow monolith in the aqueous slurry from a second direction, opposite the first direction, to deposit the SCR catalyst composition on the outlet passages;

(d) removing excess slurry from the outlet passages by forcing a compressed gas stream through the inlet passages and applying a vacuum to the outlet passages; and (e) drying and calcining the coated wall flow monolith.

The wall flow monolith used in the method preferably has a porosity of at least 50% (e.g., from 50 to 75%) having a mean pore size of at least 5 microns (e.g., from 5 to 30 microns).

Preferably, the SCR catalyst composition permeates the walls at a concentration of at least 1.3 $g/in^3$ (and preferably from 1.6 to 2.4 $g/in^3$).

BRIEF DESCRIPTION OF THE DRAWINGS

FIGS. 1A and 1B are schematic depictions of two embodiments of the emission treatment system of the invention;

DETAILED DESCRIPTION OF THE INVENTION

Figure 2:
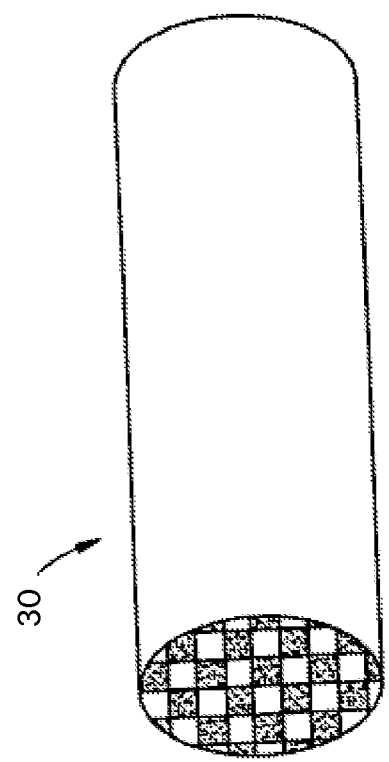
FIG. 2 shows a perspective view of a wall flow filter substrate.

The invention relates to an emission treatment system that effectively provides simultaneous treatment of the particulate matter, the NOx and other gaseous components of diesel engine exhaust. The emission treatment system uses an integrated soot filter and SCR catalyst to significantly minimize the weight and volume required for the emissions system. Moreover, due to the choice of catalytic compositions implemented in the system, effective pollutant abatement is provided for exhaust streams of varying temperatures. This feature is advantageous for operating diesel vehicles under varying loads and vehicle speeds which significantly impact exhaust temperatures emitted from the engines of such vehicles.

Integration of NOx reduction and particulate removal functions into a single catalyst article is accomplished using a wall flow substrate coated with an SCR catalyst composition. Applicants have found a method for applying an SCR catalyst composition to a wall flow substrate to form a substrate that can be used in an application where high filtration efficiency is required. For instance, a substrate formed with this method is suitable for effectively removing particulate matter (e.g., greater than 80%) in the emission treatment system of the invention. The coating method disclosed herein allows wall flow substrates to be loaded with practical levels of SCR catalyst without causing excessive back pressure across the coated article when implemented in emission treatment systems.

Achieving practical levels of SCR catalyst composition on the wall flow substrate is important for providing sufficient catalytic activity to achieve mandated NOx reduction levels, and for lowering the combustion temperature of the soot fraction trapped on the filter. Achieving adequate levels of SCR washcoat compositions on the soot filter is also important to secure adequate durability for the catalyst. Over extended use of the emission treatment system, catalysts are invariably exposed to various levels of catalyst poisons that may be derived through break down of lubricating oils, or may arise from impurities in the diesel fuel. Examples of such catalyst poisons include phosphorus, zinc, alkali and alkaline earth elements. Higher levels of catalyst compositions are therefore typically deposited on catalyst substrates to overcome the inevitable loss of catalytic activity.

One embodiment of the inventive emission treatment system is schematically depicted in FIG. 1A. As can be seen in FIG. 1A, the exhaust containing gaseous pollutants (including unburned hydrocarbons, carbon monoxide and NOx) and particulate matter is conveyed from the engine 15 to an oxidation catalyst 11. In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the soot filter 12 (i.e., clogging), which is positioned downstream in the system. In addition, a substantial proportion of the NO of the NOx component is oxidized to $NO_2$ in the oxidation catalyst.

Downstream of the oxidation catalyst is a reductant, in this case ammonia, is injected as a spray via a nozzle (not shown) into the exhaust stream. Aqueous urea shown on one line 18 can serve as the ammonia precursor which can be mixed with air on another line 19 in a mixing station 16. Valve 14 can be used to meter precise amounts of aqueous urea which are converted in the exhaust stream to ammonia. The exhaust stream with the added ammonia is conveyed to the soot filter 12 which is coated with an SCR catalyst composition. On passing through the soot filter, the NOx component is converted through the selective catalytic reduction of NOx with ammonia to nitrogen. The increased proportion of $NO_2$ in the NOx due to the catalytic action of the upstream oxidation catalyst facilitates the reduction of the NOx as compared to exhaust streams containing smaller proportions of $NO_2$ in the NOx component.

Depending on the desired level of NOx removal, additional SCR catalyst can be disposed downstream of the soot filter. For example, the additional SCR catalyst may be disposed on a monolithic, honeycomb flow through substrate or ceramic foam substrate downstream of the soot filter. Even in these embodiments, the use of the coated SCR soot filter still achieves a reduction in the total volume of catalyst required to meet NOx reduction goals.

The particulate matter including the soot fraction and the VOF are also largely removed (greater than 80%) by the soot filter. The particulate matter deposited on the soot filter is combusted through the regeneration of the filter, which process is also aided by the presence of the SCR catalyst composition. The temperature at which the soot fraction of the particulate matter combusts is lowered by the presence of the catalyst composition disposed on the soot filter.

An optional configuration is shown in FIG. 1B where the emission treatment system is provided with a slip oxidation catalyst 13 downstream of the coated soot filter 12. The slip oxidation catalyst can be coated, for example, with a composition containing base metals and less than 0.5 wt % of platinum. This provision can be used to oxidize any excess $NH_3$ before it is vented to the atmosphere.

Suitable SCR catalyst compositions for use in the system are able to effectively catalyze the reduction of the NOx component at temperatures below 600 C, so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. In addition, SCR catalyst compositions for use in the system are also ideally able to aid in the regeneration of the filter by lowering the temperature at which the soot fraction of the particulate matter is combusted. Another desirable attribute for the composition is that it possess the ability to catalyze the reaction of $O_2$ with any excess $NH_3$ to $N_2$ and $H_2O$, so that $NH_3$ is not emitted to the atmosphere.

Useful SCR catalyst compositions used in the inventive system also have thermal resistance to temperatures greater than 650° C. Such high temperatures are often encountered during the regeneration of soot filters. Additionally, SCR catalyst compositions should resist degradation upon exposure to sulfur components, which are often present in diesel exhaust gas compositions.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

Zeolites used in such compositions are resistant to sulfur poisoning, sustain a high level of activity for the SCR process, and are capable of oxidation of excess ammonia with oxygen. These zeolites have a pore size large enough to permit adequate movement of the reactant molecules NO and $NH_3$ in to, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for both the SCR process and the oxidation of ammonia with oxygen, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant NOx and $NH_3$ molecules and reactant $NH_3$ and $O_2$ molecules. Any zeolites meeting the foregoing criteria are suitable for use in the practices of the present invention; specific zeolites which meet these criteria are USY, Beta and ZSM-20. Other zeolites may also satisfy the aforementioned criteria.

When deposited on the wall flow monolith substrates, such SCR catalyst compositions are deposited at a concentration of at least 1.3 g/in$^3$ to ensure that the desired NOx reduction and particulate removal levels are achieved and to secure adequate durability of the catalyst over extended use. In a preferred embodiment, there is at least 1.6 g/in$^3$ of SCR composition, and in particular, 1.6 to 2.4 g/in$^3$, disposed on the wall flow monolith.

Wall flow substrates useful for supporting the SCR catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Figure 3:
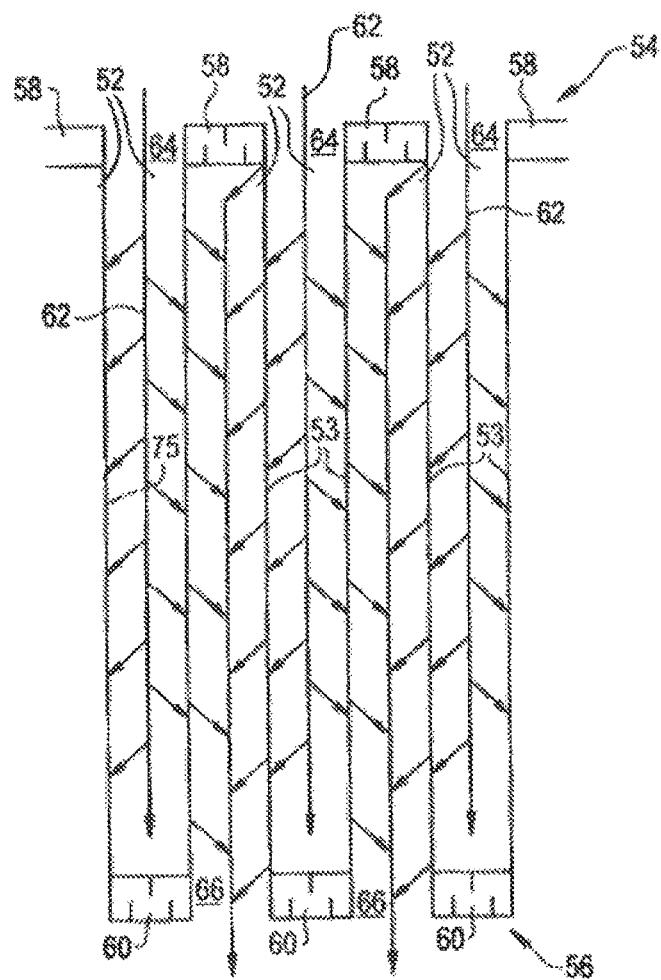
FIG. 3 shows a cutaway view of a section of a wall flow filter substrate.

FIGS. 2 and 3 illustrate a wall flow filter substrate 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Preferred wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite and silicon carbide. Such materials are able to withstand the environment, particularly high temperatures, encountered in treating the exhaust streams.

Preferred wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 50% (e.g., from 50 to 75%) having a mean pore size of at least 5 microns (e.g., from 5 to 30 microns). More preferably, the substrates have a porosity of at least 55% and have a mean pore size of at least 10 microns. When substrates with these porosities and these mean pore sizes are coated with the techniques described below, adequate levels of SCR catalyst compositions can be loaded onto the substrates to achieve excellent NOx conversion efficiency. These substrates are still able to retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Typical wall flow filters in commercial use are typically formed with lower wall porosities, e.g., from about 35% to 50%, than the wall flow filters utilized in the invention. In general, the pore size distribution of commercial wall flow filters is typically very broad with a mean pore size smaller than 17 microns.

The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

To coat the wall flow substrates with the SCR catalyst composition, the substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 450° C.). After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

A reductant dosing system is provided upstream of the soot filter and downstream of the oxidation catalyst to inject a NOx reductant into the exhaust stream. As disclosed in U.S. Pat. No. 4,963,332, NOx upstream and downstream of the catalytic converter can be sensed, and a pulsed dosing valve can be controlled by the upstream and downstream signals. In alternative configurations, the systems disclosed in U.S. Pat. No. 5,522,218, where the pulse width of the reductant injector is controlled from maps of exhaust gas temperature and engine operating conditions such as engine rpm, transmission gear and engine speed. Reference is also made to the discussion of reductant pulse metering systems in U.S. Pat. No. 6,415,602, the discussion of which is hereby incorporated by reference.

Figure 4:
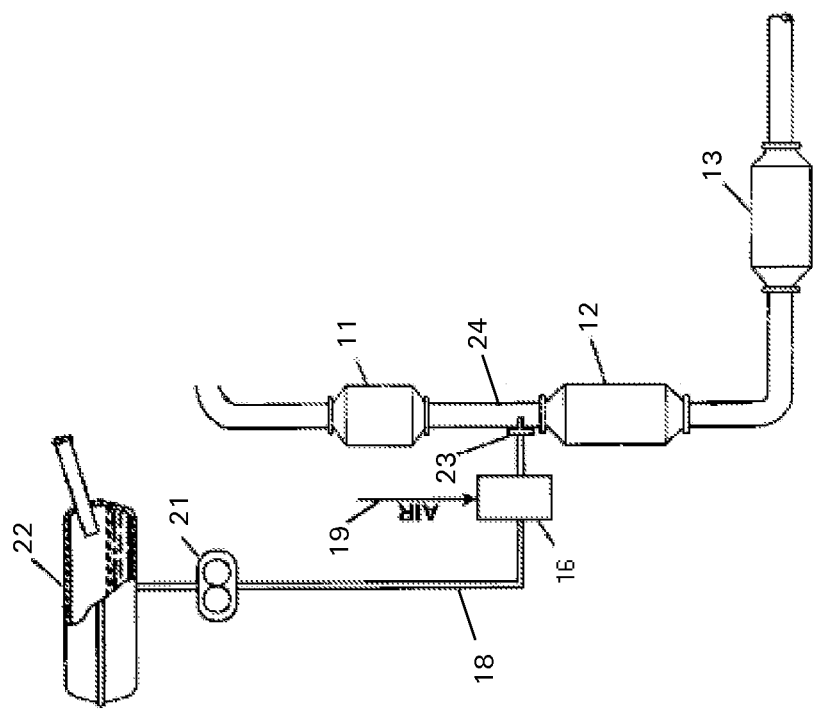
FIG. 4 shows an embodiment of the emission treatment system of the invention that includes a urea reservoir and injector.

In the embodiment of FIG. 4, an aqueous urea reservoir 22 stores a urea/water solution aboard the vehicle which is pumped through a pump 21 including a filter and pressure regulator to a urea injector 16. Urea injector 16 is a mixing chamber which receives pressure regulated air on line 19 which is pulsed by a control valve to urea injector 16. An atomized urea/water/air solution results which is pulse injected through a nozzle 23 into exhaust pipe 24 upstream of the integrated SCR catalyst coated soot filter 12.

This invention is not limited to the aqueous urea metering arrangement shown in FIG. 4. It is contemplated that a gaseous nitrogen based reagent will be utilized. For example, a urea or cyanuric acid prill injector can meter solid pellets of urea to a chamber heated by the exhaust gas to gasify the solid reductant (sublimation temperature range of about 300 to 400° C.). Cyanuric acid will gasify to isocyanic acid (HNCO) and urea will gasify to ammonia and HNCO. With either reductant, a hydrolysis catalyst can be provided in the chamber and a slip stream of the exhaust gas metered into the chamber (the exhaust gas contains sufficient water vapor) to hydrolyze (temperatures of about 150 to 350° C.) HNCO to produce ammonia.

In addition to urea and cyanuric acid, other nitrogen based reducing reagents or reductants especially suitable for use in the control system of the present invention includes ammelide, ammeline, ammonium cyanate, biuret, cyanuric acid, ammonium carbamate, melamine, tricyanourea, and mixtures of any number of these. However, the invention in a broader sense is not limited to nitrogen based reductants but can include any reductant containing hydrocarbons such as distillate fuels including alcohols, ethers, organo-nitro compounds and the like (e.g., methanol, ethanol, diethyl ether, etc.) and various amines and their salts (especially their carbonates), including guanidine, methyl amine carbonate, hexamethylamine, etc.

Upstream of the reductant dosage system is an oxidation catalyst (or DOC). The oxidation catalyst can be formed from any composition that provides effective combustion of unburned gaseous and non-volatile hydrocarbons (i.e., the VOF) and carbon monoxide. In addition, the oxidation catalyst should be effective to convert a substantial proportion of the NO of the NOx component to $NO_2$. As used herein, the term "substantial conversion of NO of the NOx component to $NO_2$" means at least 20%, and preferably between 30 and 60%. Catalyst compositions having these properties are known in the art, and include platinum group metal- and base metal-based compositions. The catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal. Preferably, the oxidation catalyst removes some of the particulate matter from the exhaust stream upstream of the wall flow filter, since the reduction in the particulate mass on the filter potentially extends the time before forced regenerations.

One preferred oxidation catalyst composition that may be used in the emission treatment system contains a platinum group component (e.g., platinum, palladium or rhodium components) dispersed on a high surface area, refractory oxide support (e.g., γ-alumina) which is combined with a zeolite component (preferably a beta zeolite). A preferred platinum group metal component is platinum. When the composition is disposed on a refractory oxide substrate, e.g., a flow through honeycomb substrate, the concentration of platinum is typically from about 10 to 120 g/ft$^3$ of platinum.

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide with an atomic ratio between the platinum group metal and the alkaline earth metal of about 1:250 to about 1:1, and preferably about 1:60 to about 1:6.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 m$^2$/g and consist essentially of a bulk second metal oxide which may be one or more of titania, zirconia, ceria-zirconia, silica, alumina-silica, and α-alumina.

Also useful are the catalyst compositions disclosed in U.S. Pat. No. 5,462,907 (the '907 patent, the disclosure of which is hereby incorporated by reference). The '907 patent teaches compositions that include a catalytic material containing ceria and alumina each having a surface area of at least about 10 m$^2$/g, for example, ceria and activated alumina in a weight ratio of from about 1.5:1 to 1:1.5. Optionally, platinum may be included in the compositions described in the '907 patent in amounts effective to promote gas phase oxidation of CO and unburned hydrocarbons but which are limited to preclude excessive oxidation of SO to $SO_2$. Alternatively, palladium in any desired amount may be included in the catalytic material.

The following examples further illustrate the present invention, but of course, should not be construed as in any way limiting its scope.

EXAMPLE 1

Coating of Ceramic Wall Flow Filters

Cordierite ceramic wall flow filter substrates (product name C611, NGK Insulators, Ltd.) having dimensions of 5.66×6 inches, a wall thickness of 0.012 in, an average pore size of 25 microns and 60% wall porosity were used to prepare catalyst-coated soot filters. 150697.5.07

A catalyst slurry containing 27% by weight solids content was formed from copper-exchanged beta zeolite (containing 2 wt. % of copper), additional $CuSO_4$ (sufficient to provide 9.5 wt. % of copper), and 7 wt. % $ZrO_2$ and de-ionized water (wt. % based on the weight of the beta zeolite). The copper-exchanged beta zeolite was prepared as in U.S. Pat. No. 5,516,497.

An identical procedure was used to prepare two of the filter substrates according to a preferred embodiment of the invention. The wall flow substrate was:

(1) dipped into the slurry to a depth sufficient to coat the channels of the substrate along the entire axial length of the substrate from one direction;

(2) air-knifed the substrate from the side opposite the coating direction (i.e., the dry side);

(3) vacuumed from the coated side;

(4) dried at 93° C. for 1 h in flowing air, and calcined at 400° C. for 1 h; and (5) Steps (1) through (4) were then repeated from the opposite side.

These filter substrates (designated as Catalysts A1 and A2) contained a catalyst loading of 2.1 g/in$^3$. The amount of copper contained on these catalysts was approximately 0.2 g/in$^3$.

Another filter substrate, designated as Catalyst B1, was prepared by coating a single side of the substrate only, following steps (1) through (4). To reach the same catalyst loading as Catalyst A1, the slurry solids content was increased to 38%. The composition of the catalyst remained the same. Catalyst B1 had a catalyst loading of 2.0 g/in$^3$. The amount of copper contained on this catalyst was also about 0.2 g/in$^3$.

A reference sample, Catalyst D1, was prepared as a flow through type catalyst. To prepare a catalyst of this type, a filter substrate of the type described above was cut across its diameter at one end, just below the depth of the plugs. Thus, the wall flow filter was converted into a flow through substrate with effectively half the frontal area blocked. This substrate was coated to obtain a catalyst loading of 2.0 g/in$^3$ of the copper-exchanged exchange beta zeolite catalyst composition.

EXAMPLE 2

Evaluation of Back Pressures for Coated Soot Filters

The pressure drop across the uncoated and coated filters was evaluated using the commercially available automated equipment, Super Flow SF 1020, (Probench). This equipment is designed specifically for measuring pressure drops as a function of air flow. Data from this equipment provides a plot of the pressure drop at ambient conditions as a function of the air flow. The pressure drop is a measure of how easily air flows through the filter. In diesel engine applications, lower pressure drops are desirable since the engine must expend power to move the air. Therefore, the larger the pressure drop, the greater the amount of engine power that is lost to pumping air. This lost power reduces the engine power that is available to the wheels.

Figure 6:
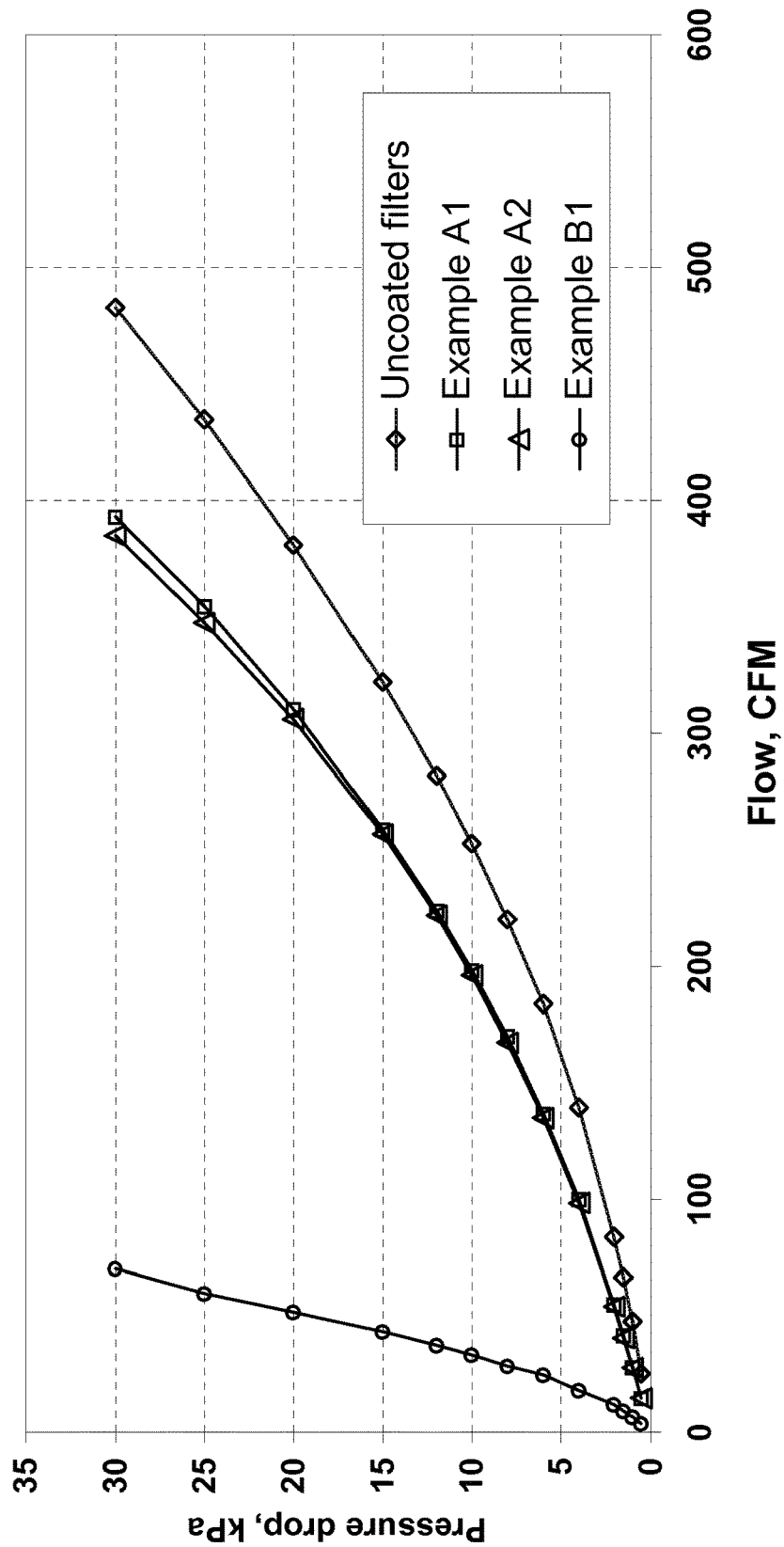
FIG. 6 shows the pressure drop as a function of the air flow for several coated wall flow filter substrates and an uncoated wall flow filter substrate.

FIG. 6 summarizes the pressure drop across the coated filters, Catalyst A1, A2 and B1, as well as an uncoated filter of the identical dimensions. The filters coated according to Steps (1) through (5) of Example 1, i.e., Catalyst A1 and A2, showed a pressure drop that was about 25% higher than the uncoated filter. In contrast to Catalysts A1 and A2, the non-optimized filter, Catalyst B1, showed pressure drops that were greater than 100% higher than the uncoated filter after coating. The pressure drop exhibited by Catalyst B1 was so high that engine testing of this filter proved impossible. Although it is possible to achieve lower pressure drops across filter coated in the same manner as Catalyst B1 by reducing the catalyst loading, lower levels of SCR catalyst loading lead to unacceptable NOx reduction levels.

EXAMPLE 3

Demonstration of Particulate Removal by the SCR Catalyst

When applied to the wall flow filter, the catalyst composition should ideally aid in the regeneration of the filter. Therefore, the SCR catalyst composition disposed on the filter is preferably able to catalyze the oxidation of soot and VOF portions of the particulate. To be effective in reducing NOx and particulate mass the SCR catalyst should preferably not oxidize ammonia or $SO_2$ to make $SO_3$. One way of evaluating a catalyst's ability to oxidize carbon and VOF is by the use of combined Thermal Gravimetric Analysis (TGA) and Differential Thermal Analysis (DTA). The TGA measures the weight loss of a sample while the DTA measures the change in sample's heat capacity versus a reference. In this experiment, a dried and calcined portion of the catalyst slurry was mixed with 6% by weight lube oil, to simulate the VOF portion of the lube, and 14% by weight carbon black, to simulate the soot fraction of the particulate. The mixture was loaded into an instrument that conducts a combined TGA and DTA. Although different gas compositions can be passed across the sample, these tests were conducted in air. The system was heated at a known rate to determine the weight loss and heat evolution as a function of temperature. An advantage of the technique is its ability to separate the weight loss of various soot components, and relate these weight losses to thermal changes. Catalysts effective in burning soot will lower the onset temperature of the soot burning.

Figure 5:
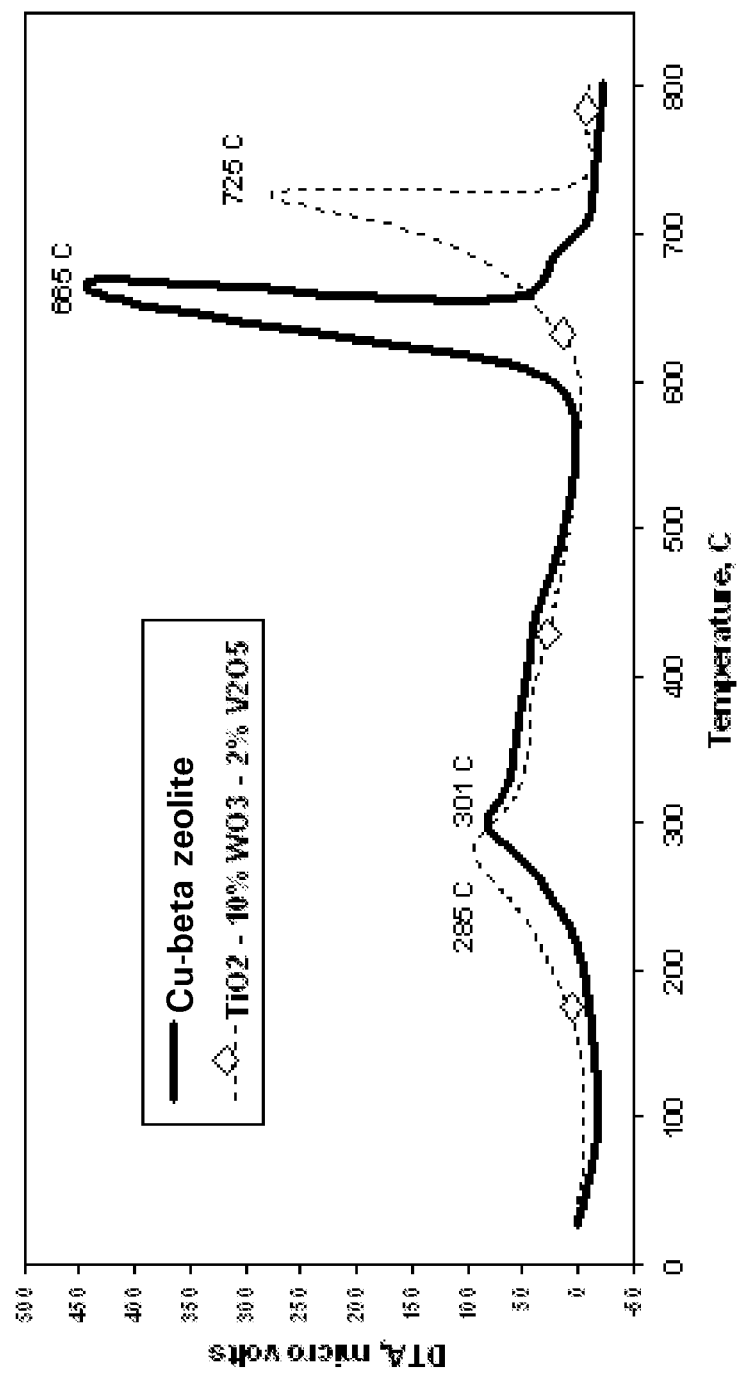
FIG. 5 is a plot of the DTA signal in microvolts as a function of temperature for two SCR catalyst compositions mixed with a model particulate mass (carbon black and lube oil)

FIG. 5 plots the DTA signal in microvolts as a function of temperature for two catalyst compositions; (1) a reference composition, $TiO_2$-10 wt. % $WO_3$-2 wt. % $V_2O_5$ catalyst, and (2) the catalyst composition used to coat Catalyst A1. The $TiO_2$-based composition is typical of the current state of art in SCR catalysts and has wide application. Powders of dried and calcined slurry of each catalyst were mixed with 6% lube oil and 14% by weight carbon black. These samples were heated at a rate of 20 C per minute, in air, from room temperature to 800° C. The resulting DTA signal shows two peaks, one at temperatures below 400° C. corresponding to the burning of the VOF, and the second peak at higher temperatures corresponding to the combustion of carbon black. Results show that both catalyst compositions were effective in burning the lube oil portion of the simulated particulate, but the preferred catalyst composition were much more effective in burning the carbon portion as evidenced by the lowering of the soot combustion temperature. As will be seen in later examples, this advantage is maintained without compromising the NOx reduction activity.

EXAMPLE 4

Evaluation of NOx Conversion and Particulate Removal for Coated Soot Filters

Figure 7:
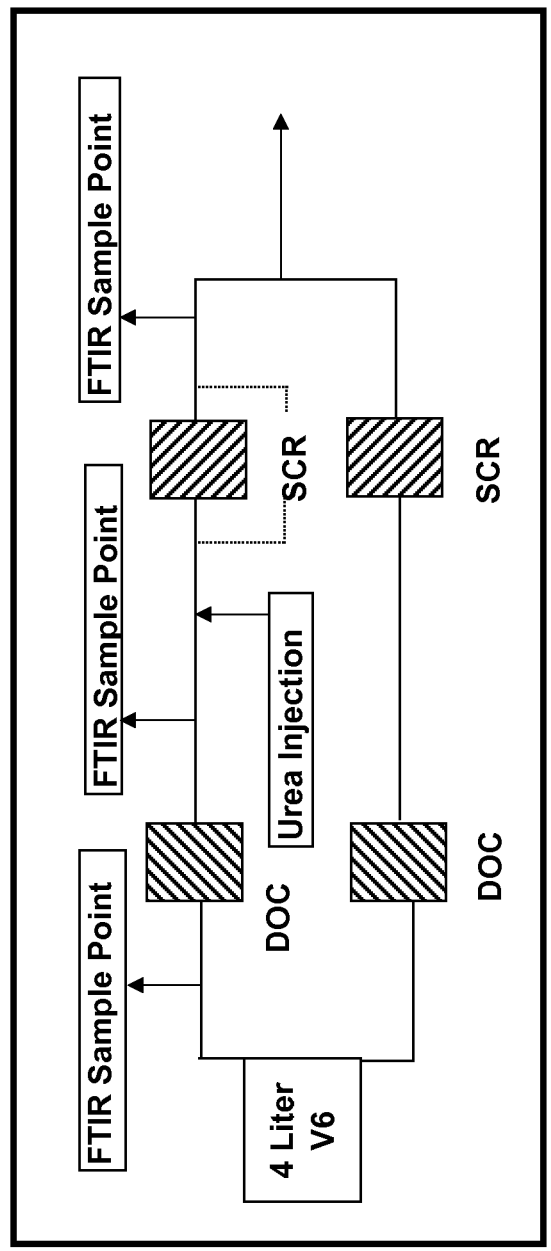
FIG. 7 is a schematic depiction of a laboratory bench system used to evaluate NOx and particulate reduction for an exemplary emission treatment system of the invention.

The filtration efficiency and simultaneous NOx reduction was determined using a prototype V6, 4 L turbocharged after-cooled diesel engine that is representative of the current state of the art in diesel technology. The engine was mounted on a test stand operated at steady state to provide reproducible and stable emissions. The engine speed and load were controlled to provide a filter inlet temperature of 370° C. and a NOx concentration of about 950 ppm. Particulate measurements were determined according to the procedures described in the Code of Federal Regulations, Title 40, Part 86, paragraph 1312-88, but instead of a full dilution tunnel, a mini-dilution tunnel was used. The dilution ratio was determined from the $CO_2$ concentration. NOx removal on the diesel engine was achieved by injecting a urea solution after the oxidation catalyst and before the SCR coated filter substrate. The experimental arrangement is illustrated in FIG. 7. NOx and ammonia were measured using a FTIR instrument equipped with a heated sampling line and analysis cell. NOx, CO and HC were also determined using a Horiba analysis bench, designed specially for the analysis of raw diesel exhaust.

Additional catalysts were prepared and aged for 1000 hours on a stationary diesel engine using an aging cycle that simulated passenger car driving. The aging cycle was an adaptation of the procedure described in "Durability Driving Schedule for Light Duty Vehicles and Light Duty Trucks" Code of Federal Regulations, Part 86 paragraph 836-01. The test cycle described therein specifies speeds and periodic stops for a vehicle driven around a test track. From previous work, the temperature profile of this cycle was measured, and then simulated on an engine bench. The aging and the evaluation used ARCO ECD diesel fuel. This fuel has a sulfur content of 12 ppm, consistent with the fuel expected to be available during the expected application of the technology.

Using the experimental configuration shown in FIG. 7, the NOx conversion and particulate removal were determined for three catalyst substrates. As seen in FIG. 7, the experimental configuration included a urea injector, upstream of the catalyzed soot filter, and an oxidation catalyst (DOC) upstream of the urea injector. To eliminate any of a variation due to the DOC, all of the trials were conducted with the same DOC. The oxidation catalyst composition was disposed on a 5.66×6 in flow through cordierite substrate. The oxidation catalyst composition contained 90 g/ft$^3$ dispersed on γ-alumina, and contained 27 wt. % hydrogen ion exchanged-beta zeolite. The DOC was aged 1000 hours.

In the trials conducted in this experiment, the SCR catalyst composition was disposed on either a wall flow monolith substrate or a flow through monolith substrate. The SCR catalyst composition was identical to that used to coat the substrates in Example 1, i.e., it contained a copper-exchanged zeolite with a zirconia binder. In particular, the substrates used in the experiment were: a fresh catalyst substrate prepared identically to Catalyst A1 in Example 1 (designated as Catalyst A1$_{fresh}$); a separate catalyst substrate also coated identically to Catalyst A1, but aged 1000 hours (designated as Catalyst A1$_{aged}$); and finally the third catalyst substrate which was of the flow through type, prepared identically to Catalyst D1 (designated as Catalyst D1$_{fresh}$).

Table 1 below summarizes particulate filtration efficiency and NOx reduction for the three catalyst substrates. The filtration efficiency was determined with and without urea injection.

TABLE 1

| Trial # | Catalyst | Substrate Type | NH$_3$/NOx | % NOx conv. | NH$_3$ slip, ppm | Total Particulate Removal, % |
|---|---|---|---|---|---|---|
| 1 | D1$_{fresh}$ | flow through | 0 | <5 | 0 | <10 |
| 2 | D1$_{fresh}$ | flow through | 0.3 | 30 | 0 | <10 |
| 3 | A1$_{fresh}$ | wall flow | 0 | <5 | 0 | 82 |
| 4 | A1$_{fresh}$ | wall flow | 0.5 | 51 | 0 | 85 |
| 5 | A1$_{aged}$ | wall flow | 0 | <5 | 0 | 81 |
| 6 | A1$_{aged}$ | wall flow | 0.5 | 55 | 0 | 85 |

As can be seen in Table 1, disposing the SCR catalyst composition on the wall flow monolith, did not cause a loss of NOx removal efficiency. Moreover, the filtration efficiency is unaffected by urea injection. While the SCR coated flow monolith provided NOx removal function, it lacked high filtration efficiency demonstrated by the coated, wall flow monoliths. Thus, these coated SCR filter substrates of the invention demonstrate integrated, high NOx and particulate removal efficiency.

Moreover, the durability of the SCR catalyst composition is demonstrated by the data in Table 1. Aging the coated substrate caused neither a loss of filtration efficiency nor NOx removal efficiency.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A catalyst article comprising a wall flow monolith and a catalytic material contained within the wall flow monolith, wherein the wall flow monolith has a wall porosity of at least 50% and comprises a plurality of longitudinally extending passages formed by longitudinally extending porous walls bounding and defining said passages, wherein the passages comprise inlet passages having an open inlet end and a closed outlet end, and outlet passages having a closed inlet end and an open outlet end, and wherein the catalytic material comprises a zeolite and a base metal selected from copper and iron present in an amount of from about 0.1 to 30 percent by weight of the total weight abase metal plus zeolite, the zeolite having pores connected in three dimensions and a silica to alumina ratio of at least about 10, the wall flow monolith having integrated NOx and particulate removal efficiency when exposed to diesel engine exhaust and ammonia or an ammonia precursor.

2. The catalyst article of claim 1, wherein the base metal selected from copper and iron is present in an amount of from about 1 to 5 percent by weight of the total weight of base metal plus zeolite.

3. The catalyst article of claim 1, wherein the wall flow monolith has from about 100 to 400 cells per square inch.

4. The catalyst article of claim 1, wherein the wall flow monolith has a wall thickness between 0.002 and 0.015 inches.

5. The catalyst article of claim 1, wherein the catalytic material permeates the porous walls at a concentration of 1.6 to 2.4 g/in$^3$, and wherein the porous walls have a porosity of from 55 to 75% and an average pore size of from 10 to 30 microns.

6. The catalyst article of claim 1, wherein the wall flow monolith comprises cordierite or silicon carbide.

7. The catalyst article of claim 1, wherein the catalytic material has a thermal resistance to degradation at temperatures greater than 650° C.

8. The catalyst article of claim 1, wherein the catalytic material is effective to resist degradation upon exposure to sulfur components.

* * * * *

UNITED STATES PATENT AND TRADEMARK OFFICE
CERTIFICATE OF CORRECTION

PATENT NO. : 10,518,254 B2  
APPLICATION NO. : 16/262561  
DATED : December 31, 2019  
INVENTOR(S) : Joseph A. Patchett, Joseph C. Dettling and Elizabeth A. Przybylski Page 1 of 1

It is certified that error appears in the above-identified patent and that said Letters Patent is hereby corrected as shown below:

On the Title Page

In page 2, Column 1, item (56), U.S. Patent Documents, cite no. 30, delete "Farrauto" and insert --Farrauto et al.--, therefor.

In page 2, Column 2, item (56), Foreign Patent Documents, cite no. 11, delete "1989-0313052" and insert --1989-03130522--, therefor.

In the Specification

In Column 1, Line 20, delete "0/634,659" and insert --10/634,659--, therefor.

In the Claims

In Column 16, Line 26, Claim 1 delete "dosed" and insert --closed--, therefor.

In Column 16, Line 30, Claim 1 delete "abase" and insert --of base--, therefor.

Signed and Sealed this  
Twenty-second Day of September, 2020

Andrei Iancu  
*Director of the United States Patent and Trademark Office*